United States Patent [19]

Koebisu et al.

[11] Patent Number: 4,522,887
[45] Date of Patent: Jun. 11, 1985

[54] LAMINATED FILM OF BIAXIALLY ORIENTED POLYPROPYLENE AND AN OLEFIN POLYMER FILM

[75] Inventors: Mamoru Koebisu, Moriyama; Masayuki Shinzawa, Ohtsu; Masatsugi Murakami, Moriyama, all of Japan

[73] Assignee: Toray Industries, Inc., Tokyo, Japan

[21] Appl. No.: 590,611

[22] Filed: Mar. 19, 1984

[30] Foreign Application Priority Data

Apr. 18, 1983 [JP] Japan ............................ 58-66945
Jul. 11, 1983 [JP] Japan ........................... 58-124842

[51] Int. Cl.$^3$ .................. B32B 15/08; B32B 27/08; B65D 65/00
[52] U.S. Cl. .................................. 428/461; 428/464; 428/516; 428/910; 428/425.8; 428/425.1; 428/424.4; 40/2 R; 229/87 G; 229/87 F; 220/449; 220/450
[58] Field of Search ................ 428/516, 461, 464, 910

[56] References Cited

U.S. PATENT DOCUMENTS

| | | | |
|---|---|---|---|
| 3,508,944 | 4/1970 | Henderson et al. | 428/516 X |
| 3,671,383 | 6/1972 | Sakata et al. | 428/516 X |
| 4,283,453 | 8/1981 | Siefried et al. | 428/516 X |
| 4,297,415 | 10/1981 | Ward et al. | 428/516 X |
| 4,340,638 | 7/1982 | Brugmans | 428/464 |

*Primary Examiner*—Patricia C. Ives
*Attorney, Agent, or Firm*—Armstrong, Nikaido, Marmelstein & Kubovcik

[57] ABSTRACT

This invention provides a laminated film prepared by laminating at least one surface of a biaxially oriented polypropylene film (A) with an olefin polymer film (B) containing from 10 to 50% by weight of an ethylene component and the balance mainly comprising a propylene component, said olefin polymer film (B) having at least three peaks in the melting curve within the range of from 120° to 165° C. and a surface roughness Ra of from 0.2 to 1.5$\mu$, said laminated film being excellent in delustering quality, light transmittance, retention of delustering quality under heat and pressure, adhesion to metallized layers and to paper.

This invention further provides a laminated film prepared by laminating a polymer film (C) containing from 1 to 40% by weight of an ethylene component and the balance mainly comprising a propylene component and having one or two melting peaks within the range of from 100° to 165° C. and a surface roughness Ra of below 0.15$\mu$, in the order of arrangement of (B)/(A)/(C), said laminated film being capable of readily providing a film having a mat finish metallic luster or a mirror finish metallic luster.

14 Claims, No Drawings

LAMINATED FILM OF BIAXIALLY ORIENTED POLYPROPYLENE AND AN OLEFIN POLYMER FILM

BACKGROUND OF THE INVENTION (1) Field of the Invention

This invention relates to a laminated film of an olefin polymer. More particularly, this invention relates to a laminated film of which at least one side is mat finish, having excellent delustering quality, excellent adhesion of the delustered surface whose delustering quality is not lost during a processing at elevated temperature and pressure, etc., and more particularly, relates to a laminated film having a delustered surface on one side and a smooth surface on the other side, wherein the both sides have high adhesion to a metallized layer or paper.

(2) Description of the Prior Art

Conventional laminated films include a film prepared by lamination of ethylene/propylene block copolymer films (see, for example, Japanese Patent Publication No. 32954/1982) and a film prepared by lamination of films of a blend prepared from polypropylene and high-density or low-density polyethylene.

These conventional laminated films, however, can not show sufficient delustering property or require a mat layer which is thick enough to obtain the desired delustering quality, so that they have suffered a drawback that the total light transmittance is lowered. Further, because the peaks of their melting curves lie at a temperature below 120° C., they have another drawback that the dullness is lost when elevated pressure and heat are applied in laminating with paper, for example, in print laminating.

On the other hand, studies have been made on the application of laminated paper prepared by laminating a metallized film with paper, instead of conventional aluminum foil. Such a laminate is used inside wrapping paper of cigarettes which requires a gas barrier property, or as paper for use in making fancy boxes for European wine or strong drink etc., which must be matted to give an appearance of quality products. This use is because of an abrupt rise of the price of the aluminum foil and the drawback of its liability to wrinkle during handling.

These laminated papers, however, are not satisfactory in adhesive strength between the film and the metallized layer or a print layer, so that they are easily damaged and peeled by friction.

SUMMARY OF THE INVENTION

It is an object of this invention to provide laminated film excellent in delustering quality, light transmittance, and retention of delustering quality under heat and pressure.

It is another object of this invention to provide a laminated film which can show excellent adhesion to a metallized layer or paper in carrying out vacuum vapor deposition or bonding with paper, as in print laminating.

It is still another object of this invention to provide a laminated film which its one surface is a mat finish surface and another one is a smooth surface and has high adhesive strength to a metallized layer or paper.

It is a further object of this invention to provide a laminated paper which has frictional resistance and high adhesive strength to paper and which, when metallized, exhibits an excellent matted metallic luster or an excellent mirror finish metallic luster.

Namely, this invention relates to a laminated film comprising a biaxially oriented polypropylene film (A) having an olefin polymer film (B) laminated on at least one surface thereof, said olefin polymer film (B) comprising 10 to 50% by weight of an ethylene component, the balance mainly comprising a propylene component, and having at least three peaks in the melting curve within the range of from 120° to 165° C. and a surface roughness Ra of from 0.2 to 1.5 $\mu$. Further, this invention relates to a laminated film comprising a biaxially oriented polypropylene film (A), an olefin polymer film (B) comprising 10 to 50% by weight of an ethylene component, the balance mainly comprising a propylene component, and having at least three peaks in the melting curve within the range of from 120° to 165° C. and a surface roughness Ra of from 0.2 to 1.5 $\mu$, and a polymer film (C) comprising 1 to 40% by weight of an ethylene component, the balance mainly comprising a propylene component, and having one peak or two in the melting curve within the range of from 100° to 165° C. and a surface roughness Ra below 0.15 $\mu$, said laminated film having the laminate structure of (B)/(A)/(C).

DESCRIPTION OF THE PREFERRED EMBODIMENTS

The biaxially oriented polypropylene (hereinafter, abbreviated as OPP) film in this invention is one that is oriented by a well-known method such as simultaneous biaxial orientation or sequential biaxial orientation, and contains polypropylene in an amount of above 50% by weight, based on the film. Preferred polypropylene includes conventional polypropylene homopolymer, such as one having an isotacticity index (I.I) of from 95 to 98% and a melt index (M.I.) at 230° C. of from 1 to 20 g/10 min. Sometimes, it is also possible to use a blend containing below 50% by weight of another olefinic resin such as a homopolymer or copolymer of an $\alpha$-olefin represented by ethylene or butene-1.

Although the thickness of the OPP film is not particularly limited, it is preferably 3 to 120 $\mu$.

It is also possible to use additives which are usually added, such as heat stabilizers, antioxidants, nucleating agents, antistatic agents, lubricants, fillers, or weathering stabilizers, in amounts not to cause detriment to the merits of this invention.

As the polymer film (B) in this invention, there can be used a film of a polymer which contains from 10 to 50% by weight, preferably from 15 to 40% by weight of an ethylene component and the balance mainly comprising a propylene component, and which has at least three peaks in the melting curve within the range of from 120° to 165° C. Exemplary of this are ethylene/propylene block copolymers having the above characteristics (hereinafter, abbreviated as EPBC). It is also possible to use a blend of polyethylene, polypropylene, other poly-$\alpha$-olefins or ethylene/propylene random copolymers (hereinafter, abbreviated as EPRC), within a limit not to cause detriment to the merits of this invention. Here, when polypropylene is blended, it is preferred to use it in an amount of below 50% by weight, preferably below 30% by weight, based on the polymer film (B) because the adhesive strength is not lowered.

Moreover, the polymer film (B) may be one that has at least three peaks in the melting curve within the range of from 120° to 165° C., preferably from three to eight peaks within the range of from 120° to 165° C., particularly preferably at least one peak within each of the three ranges of from 120° to 130° C. (not inclusive), of from 130° to 150° C. (not inclusive) and of from 150° to 165° C., and whose surface on the side opposite to the side with which the OPP film (A) is laminated has a surface roughness Ra of from 0.2 to 1.5 μ, preferably from 0.2 to 1.0 μ.

Here, it is preferred that any two adjacent peaks are separated from each other by a temperature difference of at least 5° C.

When the polymer film (B) contains below 10% by weight of an ethylene component, high adhesive strength at the above specified roughness can not be obtained, and the printability is also poor. When the polymer film has above 50% by weight of an ethylene component, the retentivity of the above specified surface roughness is lowered and uniform lamination becomes impossible in forming a composite by co-extrusion, so that the so-called "failure of lamination" sometimes occurs. When the surface roughness is outside the range of from 0.2 to 1.5 μ or when the number of the melting peaks is below 3, no sufficient dullness can be obtained.

When at least three melting peaks lie within the range of from 120° to 165° C., and further no peaks lie within the range of below 120° C., the matt finished surface of the film become resistant to flattening by the heat and pressure applied during vacuum vapor deposition or lamination, so that the delustered effect is stabilized favorably. On the other hand, the polymer film (B) having a melting peak of above 165° C. is difficult to produce.

The mat finish surface of this polymer film (B) is prepared by forming a laminated film using a polymer having the ethylene component and the number of melting peaks within the above specified ranges and setting the stretching temperature in any one of the stretching steps at a temperature of from 130° to 165° C. If desired, it is also possible to use a well-known method such as emboss processing or a process of developing spherulites, in conjunction with the above operation.

By the term "surface roughness Ra" herein used is meant a center line average roughness (cut-off value of 0.25 mm) according to JIS B 0601. Further, the polymer having at least three melting peaks is EPBC prepared by polymerization such that the necessary number of melting peaks can be formed within the specified temperature range, or can be obtained by blending this EPBC with a different olefinic polymer in an amount within a limit not to cause any detriment to the merits of this invention.

Although the thickness of the polymer film (B) is not particularly limited, it is preferably 0.5 to 10 μ.

It is also possible to add to said polymer film (B) additives of the types whose addition is well known, such as heat stabilizers, antioxidants, nucleating agents, lubricants, fillers, or weathering stabilizers within a limit not to cause detriment to the merits of this invention. Further, it is preferred that said polymer film (B) is biaxially oriented.

The EPBC which is used for forming the polymer film (B) can be produced in a variety of ways. For example, the polymerization is carried out in the presence of an inert hydrocarbon solvent (for example, hexane or heptane) using a stereoregular polymerization catalyst (for example, a catalyst system comprising a titanium trichloride catalyst and an organoaluminum compound). The polymerization is carried out in such a way that propylene is first fed and polymerized, then a propylene/ethylene mixture containing 0.5 to 10% by weight of ethylene is fed and copolymerized to form block copolymer segments, and finally a propylene/ethylene mixture containing 50 to 95% by weight of ethylene is fed and copolymerized to complete the block copolymerization. The length of the block segment growing in each of the polymerization stages is controlled by adding hydrogen at a concentration necessary in each stage. The total amount of the ethylene polymerized in the 2nd and 3rd stages is to be 10 to 50% by weight of the total of the block copolymer. The conditions for polymerization or copolymerization preferably include a pressure of from atmospheric pressure to 30 kg/cm$^2$.G and a temperature of from 40° to 90° C. The condition for each stage may be the same or different. The above-mentioned production process of the EPBC is an example of a typical process and other processes can be employed so long as they can provide polymers so prepared by polymerization as to satisfy the specification for the melting peaks of this invention.

The laminated film of this invention may be used in the form of lamination of (A)/(B) or in the form of lamination of (B)/(A)/(B), depending upon its object and use. Further, a laminated film in the form of lamination of (B)/(A)/(C) can also be prepared by laminating an olefin polymer (C) which will be described below. In this case, the outer surface of (B) is a mat finish surface and that of (C) is a lustrous smooth surface.

By the polymer film (C) used in this invention is meant a polymer which contains from 1 to 40% by weight of an ethylene component and the balance mainly comprising a propylene components, and which has one or two melting peaks apexes within the range of from 100° to 165° C. Exemplary of the polymer film (C) are films comprising ethylene propylene block copolymers (hereinafter, abbreviated as epbc), ethylene/propylene random copolymers (EPRC) having the above-specified properties and blends of the epbc or the EPRC with polyethylene, polypropylene or other polyolefins. The amount of polypropylene is preferably below 10% by weight, based on the polymer film (C) because the adhesive strength is not lowered.

Further, the polymer film (C) has one or two melting peaks within the range of from 100° to 165° C. or preferably has one or two peaks within the range of from 120° to 165° C. and its surface opposite to the side with which the OPP film (A) is laminated must have a surface roughness Ra of below 0.15 μ, preferably below 0.1 μ. Although the lower limit of the surface roughness Ra is not particularly limited, it is preferably about 0.01 μ from the viewpoint of film production.

When the ethylene component in the polymer film (C) is below 1% by weight, the adhesive strength is low and the printability is also poor. When the ethylene component is above 40% by weight, the above-specified roughness cannot be retained. When the surface roughness Ra is about 0.15 μ or when the number of the melting peaks is other than 1 or 2, the film surface can not have sufficient smoothness. When a film having a melting peak of below 100° C. is contained, slip during heating becomes poor or troubles such as sticking arise during film formation, unfavorably.

When one or two melting peaks are present within the temperature range of from 120° to 165° C. and no apex is present within the temperature range of below 120° C., the blocking property of the film is further improved desirably. A film having a melting peak of above 165° C. is difficult to produce and is not desirable also in respect of surface flatness.

Although the smooth surface of the polymer film (C) is obtained using a polymer having the ethylene component and the number of melting peaks falling within the above-specified ranges, a polymer for forming the polymer film (C) may be mixed, if desired, with a nucleating agent to obtain finer crystals and make the film surface still smoother.

Although the thickness of the polymer film (C) is not particularly limited, it is preferably 0.5 to 10 $\mu$.

The epbc or EPRC for forming the polymer film (C) can be produced in a variety of ways. For instance, it can be obtained by polymerizing propylene alone or a monomer mixture containing propylene and a small amount of ethylene in the former stage of polymerization and copolymerizing the polymer segments formed in this stage with ethylene or a monomer mixture containing ethylene and propylene in the latter stage of polymerization. When a blend of polyethylene with the EPBC, epbc, EPRC or the like is used in the polymer films (B) and (C), the ethylene component refers to the total ethylene component which is the sum of polyethylene and the ethylene component of the EPBC, epbc or EPRC.

The determination of the ethylene component of the polymer films (B) and (C) can usually be made according to the calibration curve method using an absorbance ratio at 1170 or 720 cm$^{-1}$ in an infrared absorption spectrum. Namely, this is a well-known method including determining absorbances (X) at 1170 or 720 cm$^{-1}$ assignable to the ethylene components in the infrared absorption spectra of various films having known but different ethylene contents, determining absorbances (Y) at 840 cm$^{-1}$ assignable to the propylene components, and plotting the ratio X/Y as a calibration curve. In case of the EPRC, no absorption appears at 720 cm$^{-1}$, so that its determination must be made based on an absorption at 1170 cm$^{-1}$. Although its absorption spectrum sometimes does not show a perfect spectral form but takes the form of a shoulder when the ethylene component is low, this case is also regarded as having an absorption.

In producing the laminated film, it is possible to bond the films (A) and (B) or (A), (B) and (C) with an adhesive, but it is advantageous to use a method such as co-extrusion in which the melts of polymers constituting the films (A) and (B) or (A), (B) and (C) are composed into a composite just prior to extruding them through a single die, a method in which the melts are separately melt-extruded and then laid upon and bonded before cooling and solidification, or a method in which polymer (B), or polymers (B) and (C) for coating layers are melt-extruded and bonded to the previously made base film (A).

The vacuum-deposited film refers to one prepared by forming a metallized layer on at least one surface of the above laminated film and the metallized layer refers to a layer of a metal which is vacuum-deposited. Although various known metals which have been used in vacuum deposition can be used in this invention, aluminum is preferred. Further, the method of vacuum deposition is not particularly limited, and an electrically heated melt vacuum deposition method, an ion beam vacuum deposition method, a sputtering method, an ion plating method, or the like can be employed. The thickness of the vacuum-deposited layer in the range of from 100 to 5000 Å is usually preferred.

It is preferred that the surface of the laminated film is activated by a surface treatment by, for example, corona discharge, acid or flame. It is preferred to carry out a corona discharge treatment in an atmosphere of nitrogen gas or a nitrogen/carbon dioxide gas mixture.

When the surface (B) is metallized in case of a laminated film (A)/(B) or (B)/(A)/(B), a metallized film having a delustered metallic luster can be obtained, because the surface (B) is a mat finish surface. In addition, the surface (B) has an excellent adhesiveness to the metallized layer.

If necessary, in case of a laminated film (A)/(B) having metallized layer on the outer surface of the (B), a metallized layer may further be applied on the outer surface of (A).

On the other hand, when the laminated film of (B)/(A)/(C) is used and the external side of the surface (B) is metallized, a metallized laminated film having a delustered metallic luster can be obtained, and when the external side of the surface (C) is metallized, a film is obtained which has a mirror finish luster when seen from the metallized side and has a characteristic delustered metallic luster when see from the side (B). It is possible, of course, to apply a metallized layer to each of the sides in case of a laminated film of (B)/(A)/(B) or (B)/(A)/(C).

It is one of the features of this invention that the both sides show good adhesion to metallized layer in this case.

Further, when the laminated film of (B)/(A)/(C) is used, it is possible to obtain a vacuum-deposited film having a luster adapted to the object of use from a single film by metallizing either the side (B) or the side (C). Besides, both of these layers have good adhesion, so that when it is made into a processed product such as a lamination with paper or the like, a fault of easy peelability can be improved.

The laminated paper in this invention refers to one prepared by laminating the above vacuum-deposited film with at least one side of paper. The paper as used in this laminated paper includes one formed from a material such as fiber of a plant origin or synthetic resins. Papers of various thicknesses and qualities can be used according to its use, and, for instance, paperboard is used for fancy boxes for European wine or strong drink, etc., roll paper is used for labels, and wrapping tissue is used for wrapping candies, chewing gums, etc. Further, papers prepared by laminating or coating the surfaces of paper or synthetic paper with a film can also be used.

In laminating the vacuum-deposited film with paper, adhesives which are conventionally used to bond aluminum foil with paper, that is, adhesives based on vinyl acetate, acrylic, urethane, rubber and latex can be used. Although the method of lamination can be any of wet, dry and heat-melting types, the wet process, which allows the use of an aqueous emulsion type adhesive is cheapest. Although the above adhesive can not exhibit strong adhesive strength to the OPP surface, i.e., the film layer (A), a sufficient lamination strength can be obtained in this invention whether the surface to be laminated (lamination surface) of a film is metallized or not, because the specified surface (B) or (C) is used. Namely, when the lamination surface is a non-metallized surface, very good adhesion to paper can be secured by the presence of the layer (B) or (C), and delamination between these layers never occurs. Moreover, in coating the metallized surface with an adhesive and then laminating with paper, conventional films are disadvantageous in that they do not have sufficient adhesion between a metallized layer and a film layer and delamination occurs between these layers. On the contrary, the film of this invention has a great advantage of freedom from such disadvantage.

Laminated papers having a variety of appearances can be obtained by selecting the type of the laminated film of this invention or the lamination surface of a metallized film in laminating the metallized film with paper. Table 1 shows examples of laminations among paper, a metallized layer and lamination films. Depending upon the order of lamination, three laminated papers having different dull appearances differing in the degree of dullness and one laminated paper having an appearance of a mirror finish luster can be obtained.

Namely, when the laminated film of this invention is used, the demand can be satisfied, whether a dull surface is desired or a mirror finish surface is desired, by appropriately selecting a metallized layer and a surface with which paper is laminated.

In this invention, it is also possible to apply print, if necessary, to the film surface, metallized surface or paper surface of a laminated paper. In this case, the productivity can be increased by adopting a production process of laminated paper comprising previously applying print to a lamination films or a metallized film and then laminating this with paper.

As described above, the laminated film of this invention is suitable as a print laminate which can be applied to a printed matter. Further, this film is used as a release sheet used in the production of plywood and a sheet for drawing, printing, free-albums, labels, wrapping, adhesive tapes and can also be used as a dielectric for insulating oil-impregnated capacitors.

Also in vacuum deposition, the film can be used as a film having a mild luster, and a film having a metallized polymer layer has an extremely strong adhesive strength of the metallized layer. Therefore, the film of the present invention is particularly suited as a base film for vacuum deposition.

This film, when laminated with paper to form laminated paper, is useful in making fancy boxes for European wine, or strong drink etc., or labels or wrapping paper.

In order to improve the gas barrier property, adhesiveness, printability, or the like, it is also possible to laminate the film or paper surface of a laminated paper with a different film or to coat it with a different resin according to the object. Further, its aluminum surface may be coated with a vinyl chloride/vinyl acetate type resin or other suitable resins to protect it and improve printability.

An example of the production process of the laminated paper of this invention will now be described.

(I) Laminated film

A biaxially oriented laminated film is obtained by simultaneously melt-extruding propylene, as a material for forming the OPP film, and a polymer containing an ethylene component having specified melting peaks, as a material for forming the film (B) or materials for forming the films (B) and (C), at 250° to 300° C. into a sheet of a two- or three-layered structure in which said OPP film constitutes a side or the intermediate layer, i.e., (A)/(B) for two-layered and (B)/(A)/(B) or (B)/(A)/(C) for three-layered, cooling and solidifying the extrudate by contacting it with a cooling surface of 20° to 95° C. so as to cool to below 100° C. within a short time, usually 1 to 50 seconds, longitudinally stretching said sheet with a stretch ratio of 3 to 7 while heating it to 110° to 150° C., then leading said sheet into a tenter, laterally stretching the sheet with a stretch ratio of 5 to 15 at 130° to 165° C., and heat-setting it at 110° to 160° C.

Laminating the layer (B) or the layer (C) is not limited to the above co-extrusion method but can be carried out before monoaxial stretching, or before or after the biaxial stretching.

Moreover, a simultaneous biaxial stretching method may be adopted in some cases. Mat finishing of the surface (B) can be achieved naturally as the result of at least one of the stretching steps at 130° to 165° C.

(II) Production of laminated paper

A metallized film is prepared by subjecting one surface or, if necessary, both surfaces of the above laminated film to a corona discharge treatment and then vacuum-depositing aluminum onto at least one of the surfaces.

Then, a laminated paper can be obtained by laminating one surface of the metallized film with paper using an aqueous emulsion type adhesive or the like according to its purpose.

TABLE 1

| | Laminated Film No. | | | | | |
|---|---|---|---|---|---|---|
| Layer | No. 1 | No. 2 | No. 3 | No. 4 | No. 5 | No. 6 |
| Paper | o | | o | | o | |
| Metallized layer | o | o | | | o | o |
| Film (B) | o | o | o | o | o | o |
| Film (A) | o | o | o | o | o | o |
| Film (C) | o | o | o | o | o | o |
| Metallized layer | | | o | o | o | o |
| Paper | | o | | o | | o |
| Appearance which can be seen from the opposite side of the laminated paper | mat metallic finish type 1 | mat metallic finish type 2 | mirror metallic finish type | mat metallic finish type 3 | mirror metallic finish type | mat metallic finish type 2 |

Note:
"o" denotes the constituent

Further, each of the layers of the laminated film may contain, if necessary, antioxidants, heat stabilizers, ultraviolet ray absorbers, lubricants, antistatic agents or the like in an amount within a limit which is usually admitted and not detrimental to the merits of this invention, and it is also possible to place an olefin such as polybutene or polyethylene between the layers in order to improve interfacial adhesive strength.

EFFECT OF THE INVENTION

The following excellent effects can be obtained in this invention, because the biaxially oriented PP is laminated with an olefin polymer (B), which has at least three peaks within the range of from 120° to 165° C. as determined on a differential scanning calorimeter (DSC), as a layer for imparting delustered quality.

(a) The use of the olefin polymer film (B) having at least three melting peaks increases surface scattering and affords the production of a heretofore unknown film having a low glossiness, a high haze and a high total light transmittance.

(b) As the melting peaks are higher than 120° C., it becomes possible to eliminate a drawback that the delustered effect is lost under usual conditions of elevated temperature and pressure (for example, a temperature of from 60° to 115° C. and a pressure of from 1 to 10 kg/cm$^2$) during print lamination.

(c) Adhesive strength between the surface (B) and the metallized layer is high and is excellent in abrasion and frictional resistance. Even if the metallized surface is exposed outside, it can be prevented that the metallized layer peels away. Therefore it can stand long use well.

(d) The lamination strength between the surface (B) and the paper or print of a film is extremely high, and the delustered effect is excellent, so that the film is suitable for print lamination.

(e) In laminating with paper, a wet lamination process in which an inexpensive aqueous emulsion type adhesive can be used is applicable.

(f) The printability of the surface of film (B) is excellent.

Further, in case of the laminated film of a structure (B)/(A)/(C), it becomes possible to produce any of a delustered metallized film or a film having a mirror finish luster from the same film by metallizing either the surface (B) or the surface (C). Besides, as compared with a film of the structure (C)/(A)/(C) which is apt to suffer blocking and difficult to handle, the film of the structure (B)/(A)/(C) is free from such a drawback and has an advantage that the both surfaces have good adhesion to a metallized layer, paper or the like. The printability of the surface of film (C) is excellent.

In case of the laminated paper, the following effects can be obtained.

(a) The metallized layer has a high adhesive strength, so that it is excellent in abrasion and frictional resistance. Therefore, even if the metallized surface is exposed outside, it can stand long use well and even a laminated paper whose metallized surface is laminated has sufficient lamination strength, so that it is free from a drawback that delamination occurs between the metallized surface and the film surface as in case of conventional laminated paper.

(b) The delustered effect is not lost under conditions of elevated temperature and pressure in the production of laminated paper having a mat finish appearance.

(c) A wet lamination method in which an inexpensive aqueous emulsion type adhesive is used can be adopted as the lamination method.

(d) Laminated papers having appearances of various excellent mat or mirror finish luster can easily be obtained by suitably selecting the surface to be metallized or the film surface to be laminated.

(e) When the laminated paper of this invention is formed into fancy boxes, the lamination is carried out by applying an adhesive to parts to be bonded. In this case, it is important for preventing the incomplete adhesion that the adhesive has a high initial tack before its complete setting. The laminated paper of this invention is high in this initial tack.

(f) Even when a non-metallized surface is exposed outside, the laminated paper shows excellent printability.

MEASUREMENTS OF CHARACTERISTIC PROPERTIES AND EVALUATION CRITERIA

The effects of this invention are evaluated according to the following criteria.

(1) Peak of melting curve

A differential scanning calorimeter Model DSC-2, manufactured by Perkin-Elmer Co., is used to plot a so-called second-run melting curve by heating a 5 mg sample to 280° C. at a rate of temperature rise of 20° C/min., maintaining the sample at this temperature for 5 minutes, cooling it at the same rate and heating it again. The peak of a melting curve refers to a point of inflection or a shoulder of this curve.

(2) Blocking

Film samples each measuring 3 cm wide × 10 cm long are laid upon each other so that the length of the overlapped portion is 4 cm, and allowed to stand for five days under a load of 3 kg in an atmosphere of 40° C. and 85% RH. Then, a force required for shearing and peeling is determined with a tensile tester. A smaller value of this force means a less blocking.

(3) Adhesive strength of the metallized layer

A cellophane adhesive tape (a product of Nichiban Co., Ltd.) is applied to a metallized surface and then peeled off at an angle of 180°. The adhesive strength is evaluated according to the six stages (indices) in the following table depending upon areas where the vacuum-deposited metal is left unpeeled.

TABLE 2

| Percentage of an area of a metallized layer left unpeeled after the peeling | Vacuum deposition index of metallized layer |
| --- | --- |
| 100% | 5 |
| from 95% up to 100% | 4.5 |
| from 90% up to 95% | 4 |
| from 75% up to 90% | 3 |
| from 50% up to 75% | 2 |
| up to 50% | 1 |

(4) Glossiness

The glossiness is measured according to JIS Z-8741, Method 2 and represents the intensity of reflected light at an angle of reflection of 60° obtained when light is applied at an angle of incidence of 60°. A smaller value of the glossiness means excellent delustering effect and a larger value means excellent gloss.

(5) Lamination strength

A metallized film laminated paper is peeled between the paper and the laminated film, and the stage of peeling is observed. When the lamination strength is high, the paper layer is broken and remains over the entire surface of the film.

(6) Printability

The film surface of a laminated paper was printed with an ink for polypropylene "PPST" (a product of Toyo Ink Co., Ltd.) and the adhesive strength of the printing ink is judged according to the evaluation method similar to that for the adhesive strength of the metallized film in (3) above. When a metallized surface is printed, the surface is coated with an "underlaccquer RL" (a product of Toyo Ink Co., Ltd.), then printed and evaluated. In this case, peeling occurs between the film and the metallized layer, but, for the practical purpose, this peeling can be regarded as that of the ink from the film surface. By the way, when the aluminum surface of an aluminum foil-laminated paper is printed, coating is a usual practice.

(7) Haze

This is measured according to JIS K-6714.

(8) Retention of delustering quality

The glossiness of a specified polymer layer of a film which is subjected to heat pressing at 1 kg/cm$^2$ for 0.5 second between aluminum plates heated to 115° C. is measured. The retention of delustering quality is represented by a difference in the glossiness after and before the heat pressing. A greater difference in the glossiness means a poorer retention of delustering quality.

EXAMPLES

An embodiment of this invention will be described with reference to examples.

EXAMPLE 1

Polypropylene (hereinafter, abbreviated as PP) having a M.I. (at 230° C.) of 2 g/10 min, was fed into one extruder. The EPBC prepared in such a manner that its melting peaks as measured by the DSC would occur at the three points, i.e., 121° C., 148° C. and 158° C., was fed as the polymer layer (B) into another extruder. These were melt-coextruded at 280° C. and wound around a cooling drum of 50° C. to obtain an unstretched sheet of a total thickness of about 670 μ (that of PP base being about 570 μ). While being heated to 120° C., this sheet was stretched longitudinally with a stretch ratio of 4 and led into a tenter of 170° C., where the sheet was stretched laterally with a stretch ratio of 9, given a relaxation rate of 7% to obtain a laminated film of 20 μ (the thickness of the base PP being 17 μ).

Comparative examples were carried out by using quite the same conditions as in Example 1, except that the specified polymer layer as layer (B) was replaced as follows:

Comparative Example 1

Ethylene/propylene block copolymer having two melting peaks according to the DSC of 125° and 160° C., and

Comparative Example 2

A material prepared by blending the ethylene/propylene block copolymer of Comparative Example 1 with 10% of low-density polyethylene.

The results are summarized in Table 3, which clearly shows that the laminated films from the polymer layer having the melting peak characteristic shown in Example 1 were those having a low glossiness due to the diffused reflection of the surface, a high haze and excellent delustered effect and that, because the melting peaks lay on the higher temperature side, the films had excellent retention of delustering quality and were excellent in applications to laminations in which elevated temperature and pressure were used (print lamination).

The film of Comparative Example 1 showed poor delustered effect, while that of the Comparative Example 2 showed particularly poor retention of delustering quality.

TABLE 3

| | Melting peak (°C.) of B layer | | | Film properties | | |
|---|---|---|---|---|---|---|
| | (1) | (2) | (3) | Haze (%) | Glossiness | Retention of delustering quality |
| Example 1 | 121 | 148 | 158 | 68 | 13 | 0 |
| Comparative Example 1 | 125 | 160 | — | 31 | 35 | 0 |
| Comparative Example 2 | 105 | 125 | 160 | 50 | 17 | 13 |

EXAMPLES 2 TO 6

Commercially available polypropylene pellets (melt index of 2 g/10 min, isotacticity index of 97.3%) were fed into an extruder (I). The EPBC having an ethylene component of 25% by weight and a propylene component of 75% by weight and prepared in such a manner that the melting peaks according to the DSC could occur at the three points of 121° C., 148° C. and 158° C. (melt index of 4 g/10 min) was fed into another extruder (II). The EPRC having an ethylene component of 5% by weight and a propylene component of 95% by weight (melt index of 8 g/10 min, melting peak according to the DSC at 138° C.) was fed into yet another extruder (III). These polymers were melt-coextruded through a triple layered die into a sheet at 270° C. so that both sides of the propylene layer could be laminated with the copolymers, and this sheet was wound around a cooling drum of a surface temperature of 40° C. and cooled and set. While being heated to 125° C., this sheet was stretched longitudinally with a stretch ratio of 4.5. Then, this sheet was led into a tenter, where it was stretched laterally with a stretch ratio of 9 at a stretching temperature of 160° C., heat-treated at 160° C. while being given a lateral relaxation of 5% and slowly cooled to obtain a film having a thickness of 10 μ (that of the polypropylene base layer being 6 μ and that of each copolymer layer being 2 μ).

Then, the both surfaces of the film were subjected to a corona discharge treatment at an electrical energy consumption of 15 W.min/m$^2$. This film was set within a vacuum deposition apparatus and one or both surfaces of the film were metallized so that the aluminum metallized film had a thickness of 600 Å.

Then, a laminated paper was obtained by coating the metallized film with 8 g/m$^2$ of an adhesive "Lifebond AV-650 TL" (a product of Nichiei Kako Co., Ltd., an aqueous emulsion type based on a vinyl acetate/acrylate copolymer), laminating this with a white cardboard (350 g/m$^2$) and drying the laminate at 100° C. for 30 seconds. Table 4 shows the properties of the laminated film, the metallized layer and the laminated paper.

EXAMPLE 7

A metallized film laminated paper was obtained in quite the same manner as in Example 2 except that the material fed into the extruder (III) in Example 2 was replaced with the epbc having an ethylene component of 20% by weight (melt index of 1 g/10 min and melting peaks according to the DSC at 123° and 160° C.). Table 4 shows the properties of the laminated film, the metallized layer and the laminated paper.

COMPARATIVE EXAMPLES 3 AND 4

A laminated paper was obtained in quite the same manner as in Example 2, except that the material fed into the extruder (II) in Example 2 was replaced with an ethylene/propylene block copolymer having an ethylene content of 5% by weight (melt index of 3 g/ 10 min and melting peaks according to the DSC at 125°, 143° and 160° C.), and that the material fed into the extruder III was replaced with the EPRC having an ethylene component of 0.5% by weight and a propylene component of 99.5% by weight (melt index of 7 g/10 min and melting peaks according to the DSC at 156° C.). Table 4 shows the properties of the laminated film, the metallized layer and the laminated paper.

COMPARATIVE EXAMPLES 5 AND 6

A laminated paper was obtained in quite the same manner as in Example 2, except that the material fed into the extruder (II) in Example 2 was replaced with an ethylene/propylene block copolymer having an ethylene component of 5% by weight (melt index of 3 g/10 min and melting peaks according to the DSC at 125°, 143° and 160° C.). Table 4 contains the properties of the laminated film, the metallized layer and the laminated paper.

As can be seen from Table 4, the metallized film laminated papers of Examples 2 to 7 were those having a delustered metallic luster or a mirror finish metallic luster, high lamination strength, high adhesive strength of the metallized film and excellent printability. When the ethylene component in a layer corresponding to the film layer (C) was below 1% by weight, the lamination strength with paper was low (Comparative Example 3) and the adhesive strength of the metallized layer was also low (Comparative Example 4). When the ethylene component in a layer corresponding to the film layer (B) was below 10% by weight, the adhesive strength of the metallized layer was low (Comparative Examples 3 and 6). The printability was also poor (Comparative Examples 4 and 5).

TABLE 4

| | Material properties | | | | | | | Film properties | | |
|---|---|---|---|---|---|---|---|---|---|---|
| | Ethylene component (%) | | Melting peak (°C.) | | | | | Ra (μ) | | Blocking |
| | | | Surface S | | | Surface T | | | | |
| | Surface S | Surface T | (1) | (2) | (3) | (1) | (2) | Surface S | Surface T | (g) |
| Example 2 | 25 | 5 | 121 | 148 | 158 | 138 | | 0.40 | 0.10 | 50 |
| Example 3 | " | " | " | " | " | " | | " | " | " |
| Example 4 | " | " | " | " | " | " | | " | " | " |
| Example 5 | " | " | " | " | " | " | | " | " | " |
| Example 6 | " | " | " | " | " | " | | " | " | " |
| Example 7 | " | 20 | " | " | " | 123 | 160 | " | 0.12 | 0 |
| Comparative Example 3 | 5 | 0.5 | 125 | 143 | 160 | 156 | | 0.20 | 0.09 | 130 |
| Comparative Example 4 | " | " | " | " | " | " | | " | " | " |
| Comparative Example 5 | " | 5 | " | " | " | 138 | | " | 0.10 | 120 |
| Comparative Example 6 | " | " | " | " | " | " | | " | " | " |

| Metallized surface | Adhesive strength of metallized layer | Laminated surface | Properties of laminated paper | | | Printability |
|---|---|---|---|---|---|---|
| | | | Glossiness | Lamination strength | | |
| S | 5 | T | 85 | Paper layer entirely broken | | 5 |
| S | " | S | 80 | Paper layer entirely broken | | 4.5~5 |
| T | " | S | 680 | Paper layer entirely broken | | 5 |
| T | " | T | 55 | Paper layer entirely broken | | 4.5~5 |
| both sides | for both sides 5 | T | 85 | Paper layer entirely broken | | 5 |
| T | 5 | S | 600 | Paper layer entirely broken | | 5 |
| S | 2~3 | T | 170 | Films easily delaminated | | 2~3 |
| T | 2~3 | T | 150 | Delaminated between film and metallized layer | | 3 |
| T | 5 | T | 145 | Paper layer entirely broken | | 3 |
| S | 2~3 | S | 160 | Delaminated between film and metallized layer | | 4.5~5 |

Note:
Surface S refers to the surface of a polymer extruded from extruder (II), and Surface T to the surface of a polymer extruded from extruder (III).

We claim:

1. A laminated film comprising a biaxially oriented polypropylene film (A) having an olefin polymer film (B) laminated on at least one surface thereof, said olefin polymer film (B) comprising 10 to 50% by weight of an ethylene component, the balance mainly comprising a propylene component, and having at least three peaks in the melting curve within the range of from 120° to 165° C. and a surface roughness Ra of from 0.2 to 1.5 $\mu$.

2. A laminated film as set forth in claim 1, wherein said polymer film (B) has from three to eight melting peaks within the range of from 120° to 165° C.

3. A laminated film as set forth in claim 1, wherein said olefin polymer film (B) has at least one melting peak within each of the three ranges of from 120° to 130° C. not inclusive, from 130° to 150° C. not inclusive and from 150° to 165° C.

4. A laminated film comprising a biaxially oriented polypropylene film (A), an olefin polymer film (B) comprising 10 to 50% by weight of an ethylene component, the balance mainly comprising a propylene component, and having at least three peaks in the melting curve within the range of from 120° to 165° C. and a surface roughness Ra of from 0.2 to 1.5 $\mu$, and a polymer film (C) comprising 1 to 40% by weight of an ethylene component, the balance mainly comprising a propylene component, and having one peak or two in the melting curve within the range of from 100° to 165° C. and a surface roughness Ra below 0.15 $\mu$, said laminated film having the laminate structure of (B)/(A)/(C).

5. A laminated film as set forth in claim 4, wherein said polymer film (C) has a surface roughness Ra of below 0.1 $\mu$.

6. A laminated film as set forth in claim 4, wherein said polymer film (C) contains from 2 to 30% by weight of an ethylene component and the balance mainly comprising a propylene component.

7. A laminated film as set forth in claim 4, wherein said polymer film (B) has from three to eight peaks in the melting curve within the range of from 120° to 165° C.

8. A laminated film as set forth in claim 4, wherein said polymer film (B) has at least one melting peak within each of the three ranges of from 120° to 130° C. not inclusive, from 130° to 150° C. not inclusive and from 150° to 165° C.

9. A laminated film as set forth in claim 1, which has the laminate structure of (B)/(A) of said biaxially oriented polypropylene film (A) and said olefin polymer film (B), and a metallized layer applied on the outer surface of the polymer film (B).

10. A laminated film as set forth in claim 1, which has the laminate structure of (B)/(A)/(B) of said biaxially oriented polypropylene film (A) and said olefin polymer film (B), and a metallized layer applied on the outer surface of either or both of the polymer films (B).

11. A laminated film as set forth in claim 1, which has the laminate structure of (B)/(A) of said biaxially oriented polypropylene film (A) and said olefin polymer film (B), a metallized layer applied on the outer surface of the polymer film (B), and a paper laminated on the outer surface of said metallized layer.

12. A laminated film as set forth in claim 1, which has the laminate structure of (B)/(A)/(B) of said biaxially oriented polypropylene film (A) and said olefin polymer film (B), a metallized layer applied on the outer surface of either or both of the olefin polymer films (B), and a paper laminated on either surface thereof.

13. A laminated film as set forth in claim 4, which has the laminate structure of (B)/(A)/(C) of said biaxially oriented polypropylene film (A), said olefin polymer film (B) and said polymer film (C), and a metallized layer applied on at least one surface thereof.

14. A laminated film as set forth in claim 13, which further has a paper laminated on either surface thereof.

* * * * *